United States Patent [19]

Costanza et al.

[11] Patent Number: 5,302,973
[45] Date of Patent: Apr. 12, 1994

[54] METHOD AND APPARATUS FOR IMAGE REGISTRATION IN A SINGLE PASS ROS SYSTEM

[75] Inventors: Daniel W. Costanza; William J. Nowak, both of Webster, N.Y.

[73] Assignee: Xerox Corporation, Stamford, Conn.

[21] Appl. No.: 807,927

[22] Filed: Dec. 16, 1991

[51] Int. Cl.⁵ ............................ H04N 1/21; B41J 2/435
[52] U.S. Cl. ..................................... 346/108; 346/160
[58] Field of Search ............ 346/1.1, 76 L, 108, 346/107 R, 160; 358/296, 300; 355/202

[56] References Cited

U.S. PATENT DOCUMENTS

| | | | |
|---|---|---|---|
| 4,051,779 | 10/1977 | Zaagman | 101/242 |
| 4,135,664 | 1/1979 | Resh | 235/475 |
| 4,310,153 | 1/1982 | Kikuchi | 271/259 |
| 4,660,059 | 4/1989 | O'Brien | 346/157 |
| 4,839,674 | 6/1989 | Hanagata et al. | 346/136 |
| 4,903,067 | 2/1990 | Murayama et al. | 346/160 |
| 5,072,244 | 12/1991 | Aoki et al. | 346/160 |
| 5,175,570 | 12/1991 | Haneda et al. | 346/160 |

FOREIGN PATENT DOCUMENTS 57-131616  2/1982  Japan .
59-78007  8/1984  Japan .

*Primary Examiner*—Mark J. Reinhart

[57] ABSTRACT

A single pass ROS system provides a plurality of latent images which may subsequently be developed in different colors. The ROS units are initially aligned so that each color image is precisely registered at the same relative position along the exposed area of a photoreceptor belt. The alignment is accomplished by forming a pair of opposed alignment apertures in the surface of the belt and detecting coincidence or lack of coincidence of signals generated by the beginning and end of each scan line. The skew correction is enabled by rotating an optical component in the ROS system to create the required rotation of the projected scan line so as to correct for the detected skew error caused primarily by belt conicity. Once the initial X and Y-axis alignments are complete, subsequent alignment is maintained through subsequent passes by checking the positions of the previously identified pixels as they advance past additional lead edge apertures formed in the process direction along the belt surface.

9 Claims, 3 Drawing Sheets

METHOD AND APPARATUS FOR IMAGE REGISTRATION IN A SINGLE PASS ROS SYSTEM

BACKGROUND OF THE INVENTION

The present invention relates to registration of plural image exposures formed on a photoreceptor belt by a plurality of Raster Output Scanning (ROS) systems and, more particularly, to a method and apparatus for registering the image exposures in the process direction of the belt to form registered color images in a single pass.

In a single pass, color xerographic system, a plurality of ROS stations are positioned adjacent to a photoreceptor surface and selectively energized to create successive image exposures, one for each of the three basic colors. A fourth ROS station may be added if black images are to be created as well. Thus, each image area on the photoreceptor surface must make at least three passes relative to the transverse scan line formed by a modulated laser beam generated by the ROS system. Each image must be measured to within a 0.1 mm circle or within a tolerance of ±0.05 mm. Each color image must be registered in both the photoreceptor process direction (skew registration) and in the direction parallel to the process direction (referred to as the fast scan or transverse registration). Registration in the transverse direction of a single pass ROS system is known in the prior art and a preferred registration technique is disclosed in copending U.S. application Ser. No. 07/635,835 filed on Jan. 8, 1991, and assigned to the same assignee as the present invention. Contents of this application are hereby incorporated by reference.

The present invention is directed towards a method and apparatus for registering the color images in the process direction only by detecting deviations in the skew of the color images being formed with respect to one another and by controlling registration errors at the lead edge of the images.

FIG. 1 shows a prior art, single pass, ROS color printing system 8 having four ROS systems, 10, 12, 14, and 16. The system 8 includes a photoreceptor belt 18, driven in the process direction, indicated by the arrow 19. The length of the belt 18 is designed to accept an integral number of spaced image areas $I_1$-$I_n$ represented by dashed line rectangles in FIG. 1. Upstream of each image area is a charging station (not shown) which places a predetermined electrical charge on the surface of belt 18. As each of the image areas $I_1$-$I_n$ reaches a transverse line of scan, represented by lines 20a-20d, the area is progressively exposed on closely spaced transverse raster lines 22, shown with exaggerated longitudinal spacing on the image area $I_4$ in FIG. 1. Each image area $I_1$-$I_n$ is exposed successively by ROS systems 10, 12, 14, 16. Downstream from each exposure station, a development station (not shown) develops the latent image formed in the preceding image area. A fully developed color image is then transferred to an output sheet. Details of charge and development xerographic stations in a multiple exposure single pass system are disclosed, for example, in U.S. Pat. No. 4,660,059, whose contents are hereby incorporated by reference. The charge, development, and transfer stations are conventional in the art. Each ROS system contains its own conventional scanning components, of which only two, the laser light source and the rotating polygon, are shown. The particular system 10 has a gas, or preferably, laser diode 10a, whose output is modulated by signals from control circuit 30 and optically processed to impinge on the facets of rotating polygon 10b. Each facet reflects the modulated incident laser beam as a scan line, which is focused at the photoreceptor surface. Control circuit 30 contains the circuit and logic modules which respond to input video data signals and other control and timing signals to operate the photoreceptor drive synchronously with the image exposure and to control the rotation of the polygon 10b by a motor (not shown). The other ROS systems 12, 14, 16, have their own associated laser diodes 12a, 14a, 16a, and polygons 12b, 14b, 16b, respectively. In the system of FIG. 1, transverse alignment of each successive image exposure is obtained by providing horseshoe shaped sensors 36a, 36b, 36c, 36d, which cooperate with optical targets T1, T2, T3, T4, respectively, formed in the belt surface. Further details regarding transverse alignment registration are described in the aforementioned application Ser. No. 07/635,835. However, for this prior art system, a skew or process alignment must also be accomplished to ensure complete registration of the multiple image exposures.

One of the main causes of skew error is due to belt conicity in the photoreceptor belt. Belt conicity is created when the two ends of the photoreceptor sheet are welded together to form the belt, causing the two belt edges to be of slightly different lengths. Another factor is the "set" that the belt takes over the life of the belt due to lateral deviation in tension roll or steering roll forces. A third source of potential belt conicity is the machine warm-up difference in temperature gradients from machine front-to-back causing lateral distortion. A still further potential source of conicity is movement of the photoreceptor module during, for example, a jam clearance. Any of these might create a situation, referring to FIG. 1, wherein the leading edges of images $I_1$, $I_2$, $I_3$, $I_4$ would rotate as they translate from one position to the next. If images $I_2$, $I_3$, $I_4$ are to be perfectly registered with image $I_1$, the leading edges must not be parallel to each other but must accommodate the rotation induced by the conicity of the belt. Since the degree and direction of the conicity of the belt varies from belt to belt, each ROS system must be individually aligned to correct for the initial misregistration.

According to the present invention, a method and apparatus is provided for aligning ROS units in a single pass printing system, so that each ROS is aligned along the process or X-axis, so as to compensate for belt conicity and other registration errors. After this alignment, the images formed by each ROS will be in proper registration within the prescribed tolerances. The rotational alignment in the X-direction, also referred to as a skew alignment, is made by sensing exposure lines formed by each ROS through apertures which extend transversely and are at opposite ends of the photoreceptor belt.

The ends of each scan line of each ROS are sensed simultaneously, and, if the detected signals are not coincident in time, an error signal is generated and applied to a precision, linear actuator, such as a stepper motor, which, in turn, transfers the linear motion to one of the optical components of the ROS system. In a preferred embodiment, a folding mirror is selected to be movable by the actuator, so as to change the angle of the projected scan line to correct for a detected skew error. This skew registration is accomplished for the first ROS system and then is repeated for each of the ROS systems until all four leading edge exposures, 20a, 20b, 20c, 20d, are sensed through the two skew apertures in coincidence, ensuring process registration of the associated color images. More particularly, the present invention relates to an imaging system for forming multiple image exposure frames on a photoconductive member during a single pass including:

a photoreceptor belt adapted to accommodate the formation of an integral number of image exposure frames, said belt having a first and second alignment aperture on opposite sides of the belt width and outside of the exposure frame, a plurality of Raster Output Scanners (ROS) units, each ROS unit associated with the formation of one of said image exposure frames, each ROS unit forming a plurality of projected scan lines in a fast scan (traverse) direction across the belt width, said scan lines beginning and ending at points outside of the image exposure frame, first and second detecting means associated with each of said ROS units, said detecting means adapted to sense the projected scan lines when they become visible through said alignment apertures and to generate position signals indicative thereof, and means for rotating said scan line to correct for process registration errors until the detected position signals from said first and second detecting means are concurrent.

DESCRIPTION OF THE INVENTION

Figure 1:
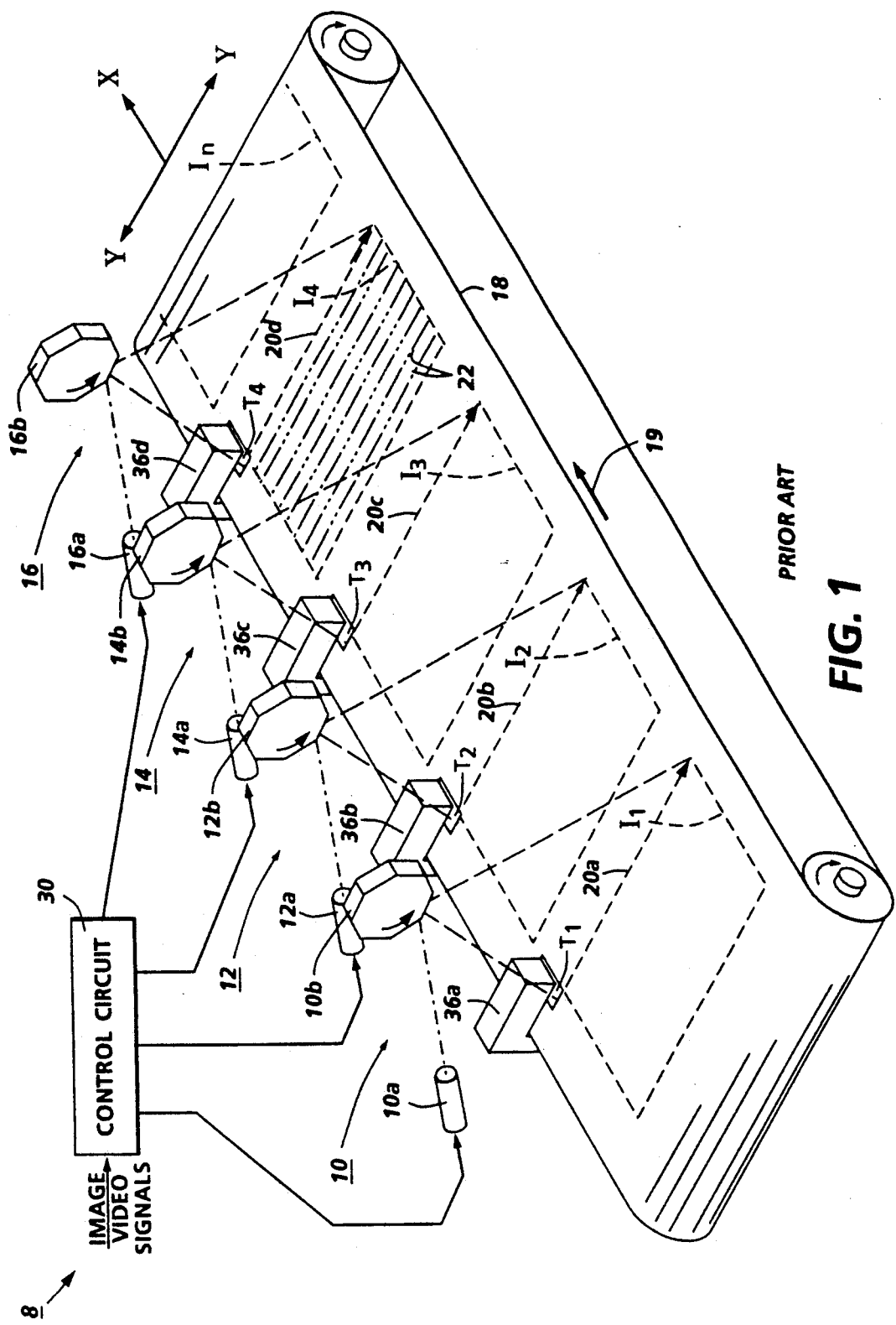
FIG. 1 is a schematic perspective view of a prior art, single pass, multiple ROS system for forming color registered images.
Figure 2:
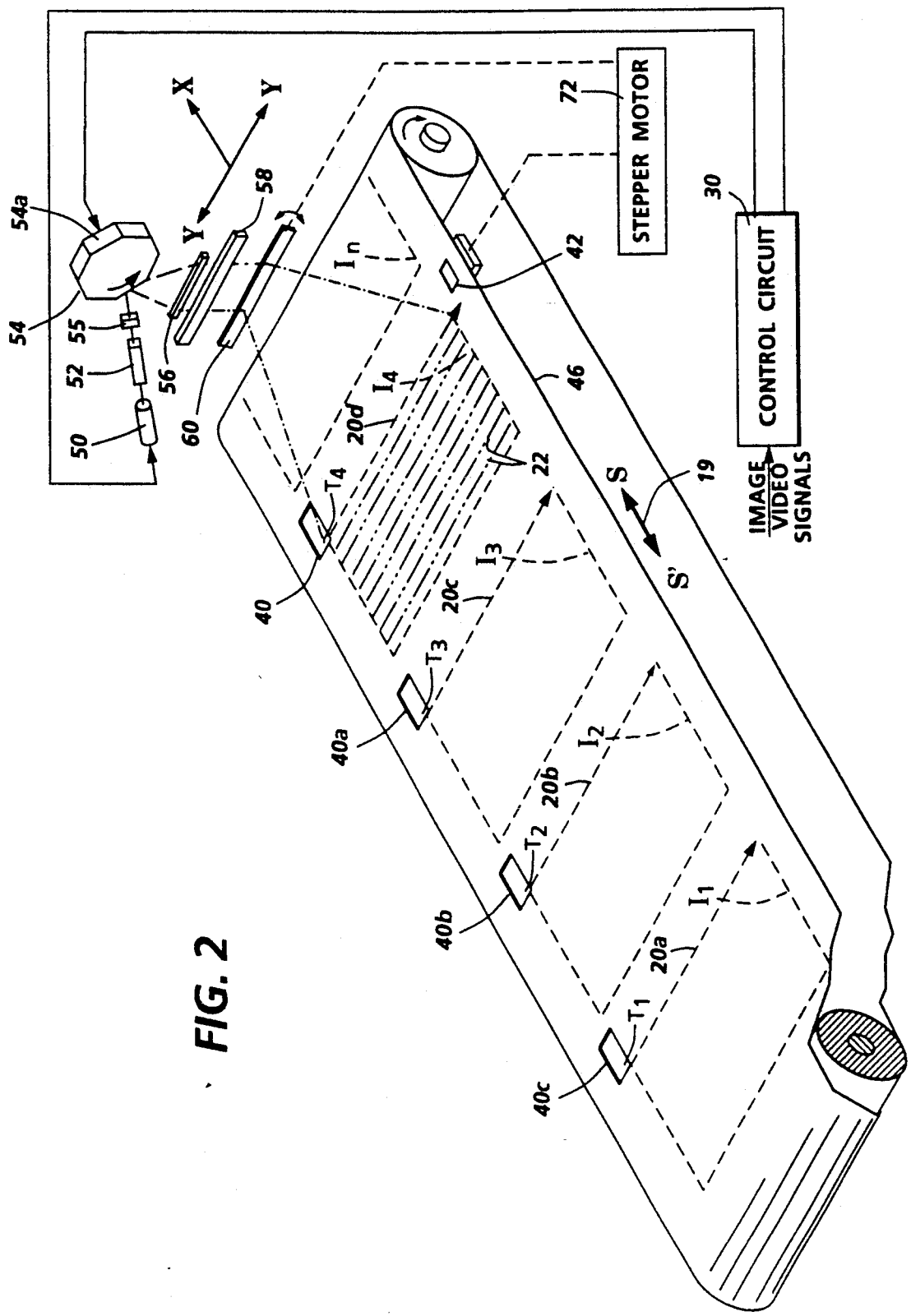
FIG. 2 is a schematic perspective view of a single pass, multiple ROS system adapted to form color images registered in the process direction, in accordance with the present invention.

Referring now to FIG. 2, the system of FIG. 1 has been modified by forming alignment apertures 40, 42 in the surface of a belt 46, at opposite ends of the belt in the Y or transverse direction, forming an imaginary reference line there between, said reference line defining the lead edge 20d of image $I_4$. As will be seen, there is no requirement for exacting tolerance in the transverse alignment of the two apertures. The apertures in a first embodiment are square shaped, but may be circular or, alternatively, may be replaced by transparent windows formed in the belt surface. The apertures are formed to be outside of the image areas, but within the scan length of the ROS.

ROS 16', in a preferred embodiment, is a compact system which comprises a laser diode 50, which is modulated in accordance with input video image signals processed through control circuit 30. The laser output is directed through a beam-shaping optical system 52 which provides collimation and beam expansion of the laser output. The collimated output from system 52 is focused onto facets 54a of rotating polygon 54 by a positive, cylindrical lens 55. Lens 55 also optically corrects for polygon-induced sagittal beam position (wobble) error. The reflected rays from polygon 54 facets are focused in the fast scan direction at the surface of belt 46 forming the scan lines 22. The beam is focused through an $f\theta$ lens 56 to linearize the beam and through cylindrical lens 59, which focuses in the sagittal direction. Belt mirror 60 folds the scan line onto the photoreceptor surface. Three other ROS systems (not shown) associated with formation of image areas $I_1$, $I_2$, $I_3$, are similarly constructed.

It is assumed that the ROS system 16' has been initially aligned to correct for any transverse registration errors. Because of the belt conicity problem discussed supra, there may also be a skew error which must be corrected for. Each ROS system will be adjustable for skew by the following procedure.

Figure 3:
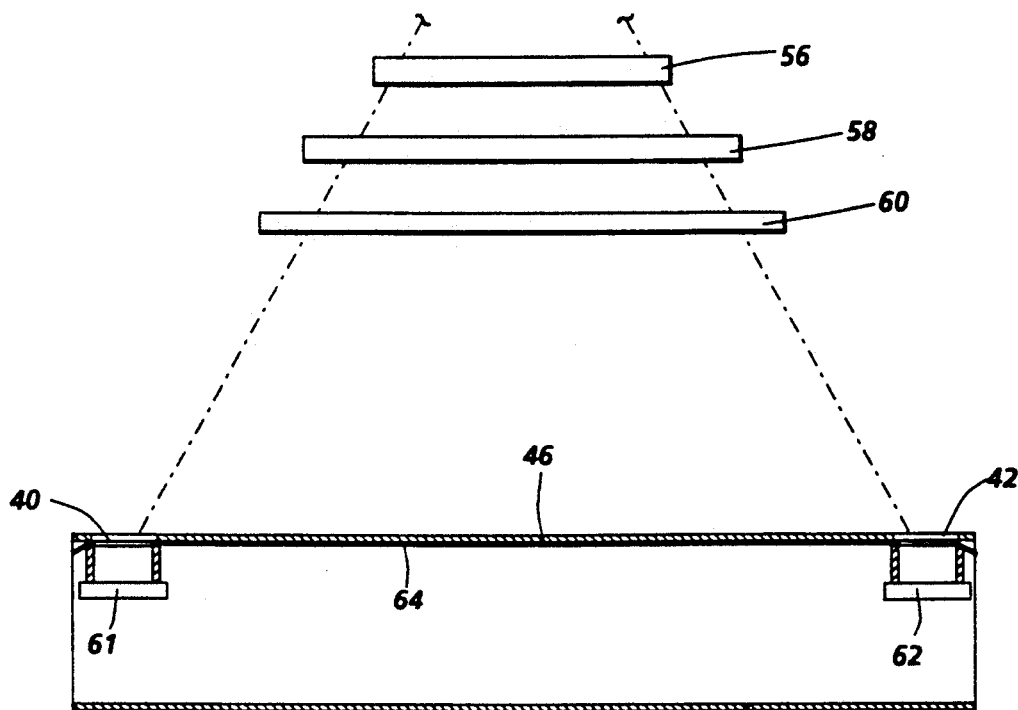
FIG. 3 is a side sectional view through line 3—3 of FIG. 2 showing the skew apertures and associated sensors.
Figure 4:
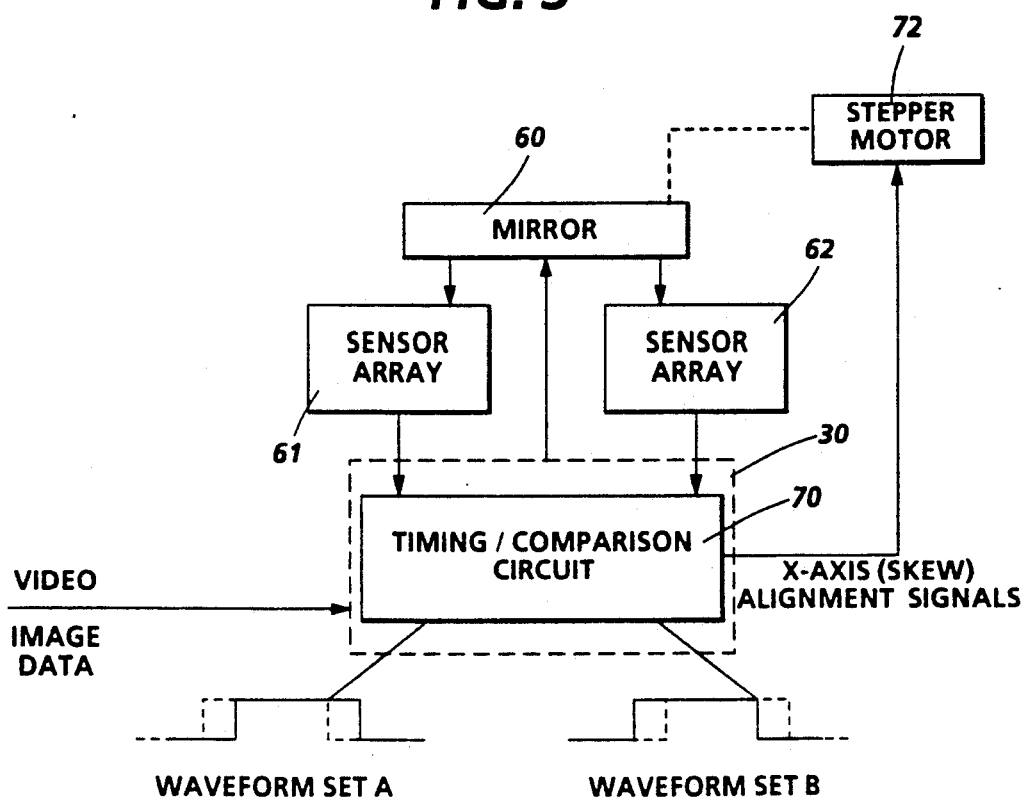
FIG. 4 is a circuit diagram of the skew alignment circuitry.

Belt 46 is moved until apertures 40, 42 are exposed by the scanned beam. As shown in FIG. 3, beneath each aperture, and on opposite sides of the belt, are light sensors 61, 62. The sensor arrays are mounted, for example, to a bar 64, which extends the width of the belt in the transverse direction. Sensor arrays 61, 62 may, for example, be PIN type silicon detectors. As the apertures moving within the belt overly the sensors, light from the ends of the projected scan line are detected by the arrays. Each detected signal for each sensor is sent to a timing comparison circuit 70 (FIG. 4) within control circuit 30. Within this circuit, three situations can be detected.

As shown in waveform set A, if the first signal is detected by array 61 (shown dotted), followed in time by the signal from detector 62, a skew adjustment signal is required to rotate the scan line in a direction opposite the process direction, (direction S in FIG. 2) until the two waveforms are sensed simultaneously. This rotational motion is accomplished by applying signals to an actuator such as stepper motor 72. Stepper motor 72 may have, for example, a 50:1 gear reduction and approximately a 28 thread/inch screw. This provides 1 micron motion/motor step resolution. The stepper motor transmits the skew correction to one of the optical components of the ROS system to cause the optical component to rotate in such a way as to rotate the projected scan line to compensate for the detected skew error. For this example, folding mirror 60 has been selected, but other components, such as lens 58 could be used. If waveform set B (FIG. 3) is generated, the rotation error is in the other direction, mirror 60 is rotated in the S' direction until the two waveforms are coincident. ROS 16', at this point, is precisely aligned in the process direction, to an imaginary reference line formed by the lead edge or by the trail edge of apertures 40, 42.

The above skew alignment procedure is repeated for each of the remaining ROS systems, advancing the same aperture pair into alignment with the projected scan line formed by each of these systems. Each ROS is then aligned in the same manner, each ROS having an associated sensor array and stepper motor, which rotates the same selected optical component. At the end of the initial alignment, all ROS systems are aligned with respect to the aperture pair, thereby enabling lead edge registration by controlling the registration at the beginning of each image area. In operation, as the lead edge of apertures 40, 40a, 40b, 40c are detected by the associated sensors, a signal will be generated within circuit 30 and a write signal applied by control circuit 30 to each ROS after a finite time interval. The time interval will be the same for all the ROS systems, since the exact position of each scan line is being sensed.

This procedure can also work with reflective/transmissive Z mark patterns on the photoreceptor. With reflective marks, the detector is mounted on the same side of the photoreceptor as the ROS unit and positioned accordingly.

In a second embodiment of the invention, one skew position stepper motor may be eliminated by accepting an initially set skew position identified for the first ROS system and adjusting the skew of the remaining ROS systems to conform to this initial skew position.

While the invention has been described with reference to the structures disclosed, it is not confined to the details set forth, but is intended to cover such modifications or changes as they come within the scope of the following claims. For example, while a full color system has been described with four image areas, the invention may be practiced in a highlight color system wherein two exposure areas, black and a second color, are exposed.

What is claimed is:

1. An imaging system for forming multiple image exposure frames on a photoconductive member during a single pass including:
   a photoreceptor belt adapted to accommodate the formation of an integral number of image exposure frames, said belt having a first and second alignment aperture on opposite sides of the belt width and outside of the exposure frame,
   a plurality of Raster Output Scanners (ROS) units, each ROS unit associated with the formation of one of said image exposure frames, each ROS unit forming a plurality of projected scan lines in a fast scan (traverse) direction across the belt width, said scan lines beginning and ending at points outside of the image exposure frame,
   first and second detecting means associated with each of said ROS units, said detecting means adapted to sense the projected scan lines when they become visible through said alignment apertures and to generate position signals indicative thereof, and
   means for rotating said scan line to correct for process registration errors until the detected position signals from said first and second detecting means are concurrent.

2. The imaging system of claim 1 wherein said belt includes additional apertures in the process direction, said additional apertures defining the lead edges of image exposure areas formed by an associated ROS unit and wherein said first detecting means is further adapted to generate edge registration signals during printer operation.

3. A method for aligning a plurality of Raster Output Scanning units which form multiple image exposure areas on a photoreceptor moving in a process direction, said method comprising the steps of:
   (a) providing a first aperture adjacent one edge of the belt outside the image exposure area and a second aperture adjacent the opposite belt edge and outside the image exposure area,
   (b) moving the photoreceptor belt until the beginning and end of the scan line from a first ROS is sensed by said first and second light sensors,
   (c) comparing the signals sensed by said first and second sensor arrays,
   (d) rotating the projected scan line to obtain coincidence of the output signals from the pair of sensor arrays thereby enabling the skew adjustment, and
   (e) repeating steps b through d for each of the remaining ROS units.

4. The method of claim 3, wherein said scan line rotation is enabled by rotating an optical component in said ROS system to change the projected skew angle of said skew line.

5. The method of claim 3 including the further step of maintaining registration during a printing operation by dynamically comparing signals from end sensor arrays as said alignment apertures pass beneath successive scan lines.

6. The method of claim 1 wherein the first and second apertures are formed as transparent windows in the photoreceptor.

7. A method for compensating for image misregistration due to conicity in a photoreceptor belt moving in a process direction comprising the steps of:
   forming a first and second aperture in the belt, the apertures located in non-image exposure edge areas of the belt,
   positioning at least a first and second Raster Output Scanner (ROS) in image forming position with respect to the belt, each said ROS forming modulated scan lines on the surface of said belt,
   moving the belt until the radiation from the beginning and end of said scan line is detected through said apertures by photodetecting means positioned beneath said apertures, and
   rotating the scan line in a process or reverse process direction until coincidence of output signals is detected at both sensors during dynamic belt motion.

8. Apparatus for process registration of an image area to be exposed on a longitudinally moving belt, said apparatus comprising:
   means for defining a pair of targets defining the lead edge of an image area,
   means for detecting the lateral position of a scan line projected by a ROS in relation to said target, and
   means for adjusting the transverse location of the ROS scan lines at the image area so as to compensate for skew misalignment.

9. Apparatus for multiple image exposures of an image area on a longitudinally moving belt, said apparatus comprising:
   modulated laser scanning means for projecting scan lines onto said belt to form an image area,
   means defining a pair of opposed targets on the belt in a position relative to the image area,
   means for detecting the lateral positions of said targets for each of the image exposures, and
   means for adjusting said scanning means for each of the image exposures in response to detected positions of said targets to assure process registration of said image exposures.

* * * * *